United States Patent
Chang

(10) Patent No.: US 6,857,761 B2
(45) Date of Patent: Feb. 22, 2005

(54) ILLUMINATION SYSTEM WITH MULTIPLE LAMPS

(75) Inventor: Sean Chang, Taoyuan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 0 days.

(21) Appl. No.: 10/456,482

(22) Filed: Jun. 9, 2003

(65) Prior Publication Data
US 2004/0070970 A1 Apr. 15, 2004

(30) Foreign Application Priority Data
Oct. 11, 2002 (TW) ........................ 91123418 A

(51) Int. Cl.⁷ .............................................. F21V 33/00
(52) U.S. Cl. ................ 362/234; 362/237; 362/238; 362/551; 353/20; 353/94; 359/485
(58) Field of Search .................... 362/234, 236, 362/237, 238, 239, 240, 551, 331; 359/485, 630, 487; 353/20, 30, 94

(56) References Cited

U.S. PATENT DOCUMENTS

| 4,882,617 | A | 11/1989 | Vriens ..................... 356/60 |
| 5,619,284 | A | 4/1997 | Magocs .................. 348/757 |
| 6,196,699 | B1 | 3/2001 | Stanton .................. 362/235 |
| 6,341,876 | B1 * | 1/2002 | Moss et al. ............ 362/268 |
| 6,508,571 | B2 * | 1/2003 | Chuang ................. 362/237 |
| 6,527,420 | B1 * | 3/2003 | Chuang ................. 362/346 |
| 6,554,464 | B1 * | 4/2003 | Hawryluk et al. .... 362/582 |
| 6,795,243 | B1 * | 9/2004 | McGettigan et al. ... 359/486 |

* cited by examiner

Primary Examiner—John Anthony Ward
(74) Attorney, Agent, or Firm—Birch, Stewart, Kolasch & Birch LLP

(57) ABSTRACT

An illumination system with multiple lamps is provided for increasing the Lumens of projected images. In the system, light guiding means having at least two light tunnels and lamps are used for guiding light emitted from the lamps to a beam splitter so that the light beams from the different lamps are converged into one single light beam, thereby increasing the power of light.

20 Claims, 2 Drawing Sheets

ILLUMINATION SYSTEM WITH MULTIPLE LAMPS

FIELD OF THE INVENTION

The invention relates to an illumination system with multiple lamps, and more particularly, to an illumination system with multiple lamps for converging lights emitted from the lamps to one focus.

BACKGROUND OF THE INVENTION

Projection techniques known today can mainly be grouped in two types: Liquid Crystal Display (LCD) projectors and Digital Light Processing (DLP) projectors. The DLP projector was developed by Texas Instrument Co. It has a very small mirror installed on a micro chip called a Digital Micromirror Device (DMD) to reflect light and generate very bright and sharp projection images. Nevertheless, projectors that adopt LCD or DLP usually use one single lamp as the light source to project images. To obtain higher lumens, the projector needs a higher-powered lamp.

Lamps with high power result in shorter usage life and more power consumption. However, using a higher power lamp increases the costs of spare parts. Hence it is not an effective technical solution.

Therefore it is necessary to develop a solution that uses more than one lamp of relatively low power to achieve an equal amount of output lumens through an optical converging process to remedy the problems of high power consumption and low illuminating efficiency that occur to the higher power lamp.

SUMMARY OF THE INVENTION

In view of the aforesaid disadvantages, the primary object of the invention is to provide an illumination system with multiple lamps that has more than one focused lamp to increase lumens for image projection.

The illumination system with multiple lamps of the invention employs two column type light tunnels and a beam splitter that are bonded together under a selected angle. It uses a reflecting mirror to reflect light beams emitted from different lamps and converges the light beams to thereby generate a greater power of light output for projectors.

In order to achieve the foregoing object, the illumination system with multiple lamps of the invention includes a beam splitter, which has a beam reflecting surface on one side and two sets of light guiding means that are respectively disposed on two sides of the beam splitter where the reflecting surface is not located. The light guiding means includes a lamp that emits light focused on a focus and a light tunnel. The light tunnel has an end reflecting surface close to the focus of the lamp and another side connecting to the beam splitter. The light tunnel end reflecting surface has an incident aperture located on the focus of the lamp so that light converged on the focal point may pass through the incident aperture and enter into the light tunnel, and output to the beam splitter through the light channel. The beam splitter has four surfaces, including a reflecting surface, two light tunnel connecting surfaces and a light output surface.

Taking one lamp as an example, a portion of the light output to the beam splitter is reflected on the beam splitting surface and outputted through the light output surface. Another portion of the light passes through the beam splitting surface, is reflected on the beam reflecting surface, and enters into the light tunnel of another light guiding means so that the light may be reflected on the light tunnel end reflecting surface and enter into the beam splitter again, It is then reflected on the beam reflecting surface to output through the light output surface of the beam splitter. Thereby light is repeatedly reflected into the beam splitter to enable a large portion of light to output through the light output surface of the beam splitter. The principle set forth above may also be adopted on another lamp.

The structure of the aforesaid illumination system with multiple lamps has two sets of lamps. According to the same principle, three sets of lamps may also be adopted. The structure includes a beam splitter and three light guiding means. The light guiding means are respectively disposed at two adjoining sides of the beam splitter, and each includes a lamp with a focus for converging light and a light tunnel. The light tunnel has one end as a reflecting surface close to the focus of the lamp and another end connecting to the beam splitter. The light tunnel end reflecting surface has an incident aperture located on the focus of the lamp so that light converged on the focus may pass through the incident aperture into the light tunnel, which channels and outputs the lights to the beam splitter. The beam splitter has four surfaces, including a reflecting surface, three light tunnel connecting surfaces and a light output surface.

Taking one lamp as an example, a portion of the light output to the beam splitter is reflected on the beam reflecting surface and outputted through the light output surface. Another portion of the light passes through the beam splitting surface and enters into a light tunnel of another light guiding means so that the light is reflected on the light tunnel end reflecting surface and enters into the beam splitter again. Thereby light is reflected repeatedly into the beam splitter to enable a large portion of the light to output through the light output surface of the beam splitter. The principle set forth above may also be adopted on the other two lamps.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
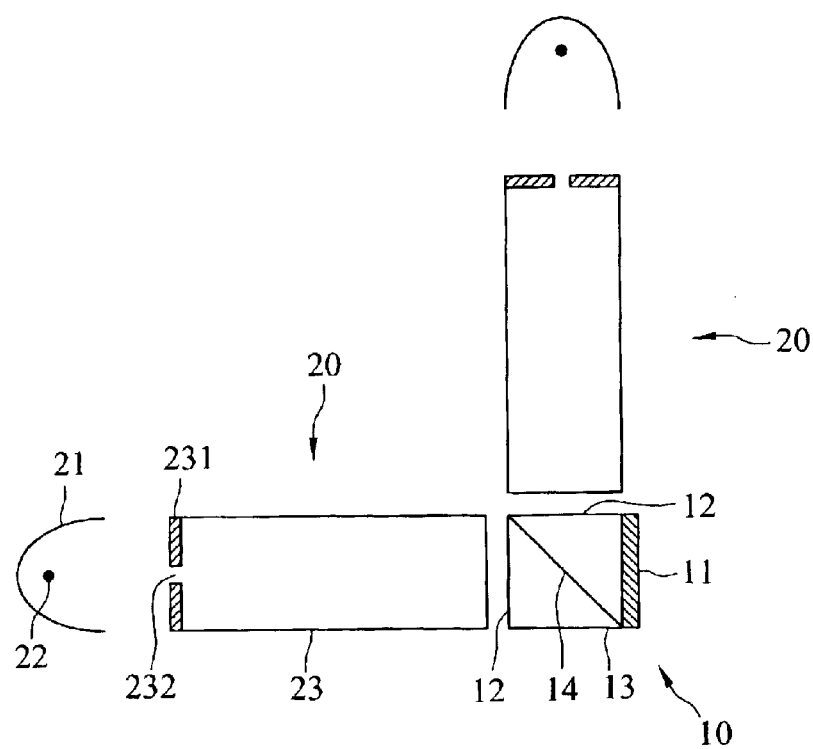
FIG. 1A is a schematic view of the system architecture of an illumination system with multiple lamps according to the first embodiment of the invention.

Refer to FIG. 1A for the system architecture of an illumination system with multiple lamps according to the first embodiment of the invention. The illumination system includes two lamps 22, a beam splitter 10 and two sets of light guiding means 20. The beam splitter 10 has four surfaces, including a beam reflecting surface 11, two light tunnel connecting surfaces 12 and a light output surface 13. The light guiding means 20 are respectively disposed at two sides of the beam splitter 10 where the reflecting surface is not located, i.e. the light tunnel connecting surfaces 12 as shown in the drawing.

To facilitate discussion, the lamp is shown by an ellipsoidal lamp in the drawing. In practice, any lamp that can focus light may be used.

The light guiding means 20 mainly consists of an ellipsoidal mirror 21, a lamp 22 and a light tunnel 23. The ellipsoidal mirror 21 has a first focus and a second focus. The lamp 22 is positioned at the first focus of the ellipsoidal mirror 21 so that light emitted from the lamp 22 is reflected on the ellipsoidal mirror 21 and converged on the second focus. The light tunnel 23 has an end reflecting surface 231 formed on one side close to the ellipsoidal mirror 21 and another side connecting to the light tunnel connecting surfaces 12 of the beam splitter 10. The connection is an optical bonding or has a small air gap. The light tunnel end close to the reflecting surface 231 has an incident aperture 232. The light tunnel 23 has one side close to the ellipsoidal mirror 21 and located on the second focus of the ellipsoidal mirror 21 so that light converged on the second focus may pass through the incident aperture 232 and enter into the light tunnel 23. It then passes through the light tunnel 23 and is outputted to the beam splitter 10 located on the other side of the light tunnel. The light tunnel 23 may be hollow or solid. For a hollow light tunnel, the interior of the tunnel is coated with a full reflective film to reflect the light entering through the incident aperture 232.

The beam splitter 10 enables the light coming from the light tunnel 23 to reflect and pass through. The properties of the beam splitter 10 do not allow the light to fully reflect on the beam splitting surface 14. A portion of the light passes through the beam splitting surface 14 and enters into another light tunnel, and is reflected on the light tunnel end reflecting surface 231 to enter into the beam splitter 10 again, and is finally outputted through the light output surface 13 of the beam splitter 10.

Hence the light entering the beam splitter 10 is reflected in the beam splitter 10 and outputted through the light output surface 13 of the beam splitter 10. The light passed through the beam splitter 10 enters into the light tunnel of another light guiding means, is reflected to the beam splitter through the light tunnel of another light guiding means, and outputted through the light output surface 13 of the beam splitter 10. Through the beam splitting surface 14 of the beam splitter 10, both the light reflected from or passed through the beam splitting surface 14 is outputted through the light output surface 13 of the beam splitter 10. Therefore, light transmission efficiency may increase and loss of light energy may be reduced. Thus, the effect of converging multiple lamps is accomplished, and light of a greater output power may be obtained on the light output surface 13 of the beam splitter 10.

Therefore, the light of either one of the two sets of light guiding means may be reflected or passed through the light tunnel end reflecting surface of the light tunnel 23 or the beam splitter 10, and finally outputted through the light output surface 13 of the beam splitter 10. As a result, light energy from two different lamps may be accumulated after being reflected to become light of a greater power. Moreover, the lamps do not have to be of the same power. Lamps of different power may be used based on requirements.

The lamps of the invention employ converging light beams rather than parallel light beams adopted in the conventional techniques. This is because most existing techniques for multiple lamp systems adopt mirrors of a parabolical surface with the lamp positioned on the focus of the parabolical surface to reflect light and generate a parallel light output. The output light is reflected by a reflecting prism to generate the final parallel output light. Light is generally reflected a number of times on the parabolical surface before being output. As the parabolical surface mirror is not spherical, it is more difficult to fabricate. The parabolical surface mirror and the prism tend to have errors during fabrication, thus it is difficult for them to form final parallel light beams.

Adopting the converging light beams, once the light beams enter into the light tunnel, they are no longer influenced by the lamp. Light is reflected reciprocally between the light tunnel and the beam splitter. The optical surface fabrication techniques for the light tunnel and beam splitter have been well established for more than one hundred years. The fabrication techniques and processes are relatively easy and can accommodate a wider range of errors and achieve a more stable output.

Figure 1B:
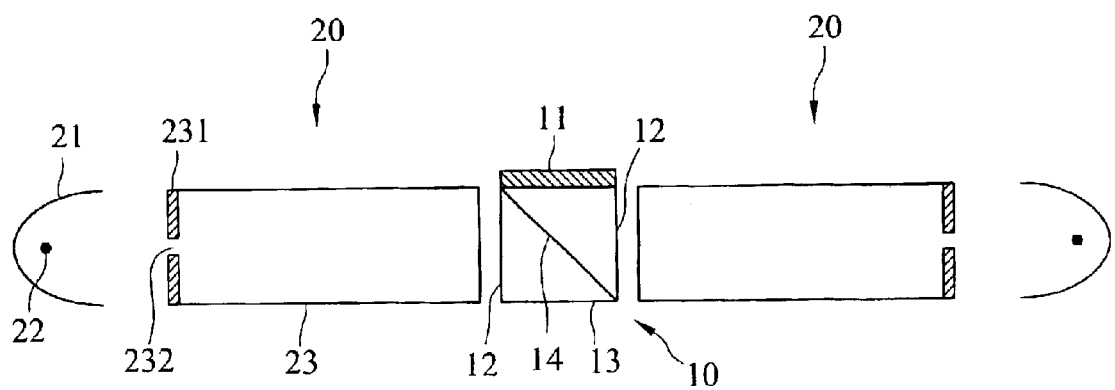
FIG. 1B is a schematic view of the system architecture of an illumination system with multiple lamps according to the second embodiment of the invention.

The light guiding means 20, in addition to being positioned at two adjacent sides of the beam splitter 10 as shown in FIG. 1A, may also be positioned at two opposite connection surfaces 12 of the beam splitter 10 as shown in FIG. 1B.

Figure 2:
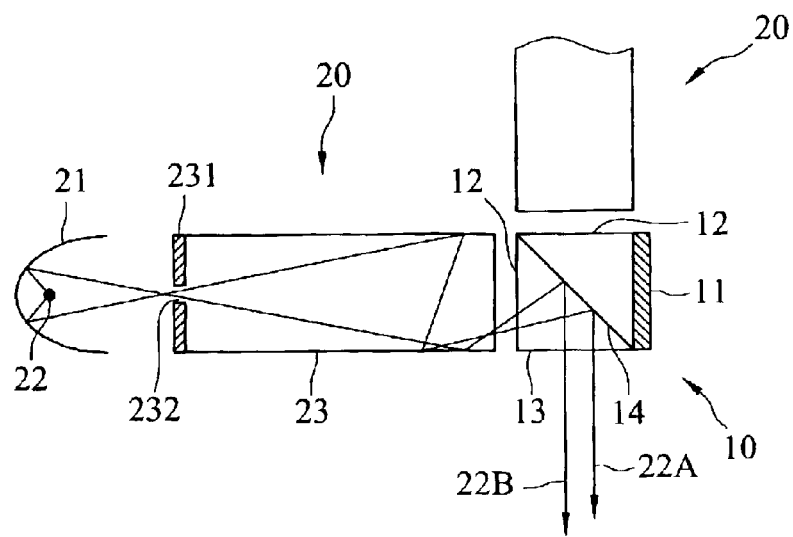
FIG. 2 is a schematic view of the invention, showing how light emitted from a lamp is converged and projected into a light tunnel.

Refer to FIG. 2 for light traveling conditions in the light tunnel. The lamp 22 is located on the first focus of the ellipsoidal mirror 21. Light beams emitted from the lamp 22 are converged on the second focus and the optical paths are converged to a conical zone. The light tunnel 23 adjacent to the ellipsoidal mirror 21 has an end reflecting surface 231 that has an incident aperture 231 to receive the incident light beams into the light tunnel 23. The size of the incident aperture 232 is just big enough to allow all the light beams converged on the second focus to pass through. The smaller the size of the incident aperture 232, the less the probability of the lights scattering through the incident aperture 232 of the light tunnel 23. The light tunnel 23 may be a solid structure made of optic glass material, or a hollow structure with air as the medium.

Taking the solid structure as an example, light beams enter the light tunnel 23 through the incident aperture 232. According to Snell's law, as long as the incident angle is kept smaller than a full reflection critical angle $\theta_c$, then the light beams entering into the light tunnel are fully reflected inside the tunnel without passing through the tunnel walls. For instance, light 22A is reflected on the ellipsoidal mirror 21 and enters into the light tunnel 23 through the incident aperture 232. After fully reflected inside the tunnel, the light 22A enters into the beam splitter 10. A portion of the light is reflected on the beam splitting surface 14 and is output through the light output surface 13. Similarly, light 22B is reflected on the ellipsoidal mirror and enters into the light tunnel 23 through the incident aperture 232. After fully reflected inside the tunnel and entered into the beam splitter 10, a portion of the light is reflected on the beam splitting surface 14 and outputs through the light output surface 13 of the beam splitter 10. After the light beams 22A and 22B enter into the beam splitter 10, they are not fully reflected. A portion of the light passes through the beam splitting surface 14 and is reflected on the beam splitter reflecting surface 11 to the light tunnel of another light guiding means. After being reflected a number of times, the light is output through the light output surface 13.

The beam splitter 10 and the light tunnel 23 may be connected by optical bonding methods (such as optical adhering) or through an air gap to reduce light absorption when the light beams pass through the bonding surface, and to improve light transmission efficiency. The beam splitter 10 keeps light traveling angles inside the light tunnel 23 smaller than the critical angle $\theta_c$, whether the traveling angle of the light is changed by reflection or unchanged by penetration. And finally through the light tunnel end reflecting surface, most incident light is emitted through the light output surface 13 of the beam splitter 10, thus a light converging effect may be achieved.

Figure 3:
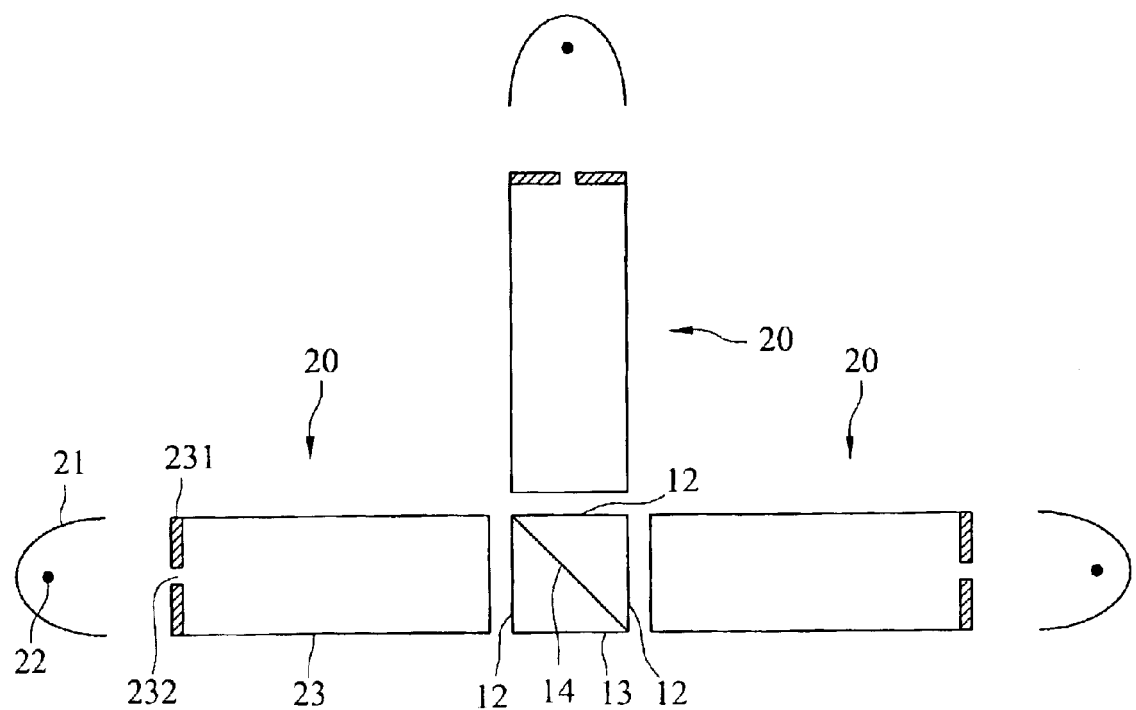
FIG. 3 is a schematic view of the system architecture of an illumination system with multiple lamps according to the first embodiment of the invention.

The embodiment set forth above is an illumination system with two sets of lamps. FIG. 3 illustrates a third embodiment of the invention with three sets of lamps. The illumination system includes a beam splitter 10 and three sets of light guiding means 20. The light guiding means 20 are respectively connected to different connecting surfaces of the beam splitter 10, i.e. the two connecting surfaces 12 of the light tunnel shown in the drawing. As with the first embodiment set forth above, the light guiding means 20 consists of an ellipsoidal mirror 21, a lamp 22 and a light tunnel 23. The ellipsoidal mirror 21 has a first focus and a second focus. The lamp 22 is positioned the first focus of the ellipsoidal mirror 21 so that light emitted by the lamp 22 is reflected on the ellipsoidal mirror 21 and converged on the second focus. The light tunnel 23 has an end reflecting surface 231 formed on one side close to the ellipsoidal mirror 21 and another side connecting to the beam splitter 10. The light tunnel end reflecting surface 231 has an incident aperture 232. The light tunnel 23 has one side close to the second focus of the ellipsoidal mirror 21 and is located on the second focus thereof. The incident aperture 232 is located on the second focus. Thus light converged on the second focus may pass through the incident aperture 232, enter into the light tunnel 23, pass through the light tunnel 23, and be outputted to the beam splitter 10 on the other side of the light tunnel. The light tunnel 23 may be hollow or solid. For a hollow light tunnel, the interior of the tunnel is coated with a full reflection film to reflect the light entering through the incident aperture 232.

The beam splitter 10 enables light from the light tunnel 23 to reflect and pass through. Because of the properties of the beam splitter 10, the light camlot be fully reflected. A portion of light passes through the beam splitting surface 14 and enters into another light tunnel. After being reflected, the light is outputted through the light output surface 13 of the beam splitter 10.

Therefore, light from any one of the three sets of light guiding means is reflected and penetrated on the light tunnel end reflecting surface and the beam splitter 10, and finally outputted through the optical output surface. Thus light energy from the three different lamps may be reflected and accumulated to achieve greater power.

The illumination system with multiple lamps of the invention employs lamps of a lower power and adopts optical reflection principles to accumulate the power of different lamps to achieve a greater power output, to thereby enable the projector to generate greater lumens. In practice, only one lamp may be turned on at a time. A power detection circuit and a switch circuit may be designed and installed on each lamp. When one of the lamps approaches the end of its service life, another lamp may be switched automatically to replace it. A manual switch method may also be adopted to enable users to select different desired lamps. Two sets of lamps may also have different output lumens to meet different requirements. By switching the lamps, total service life becomes longer.

In summary, the illumination system with multiple lamps of the invention employs light tunnels that have a lower light absorption rate and a small air gap at the connecting portion, thus the optimal light reflecting index can be achieved. Only a small amount of light escapes through the aperture after reflection. In the event that the aperture takes 30% of the total reflective surface, calculations show that theoretically a single lamp can achieve 80% of total output light. Thus, if a lamp of 1000 lumens is coupled with the dual lamp structure of the invention, 1600 lumens of output may be achieved. As a result, using lamps of lower lumens can achieve higher illumination efficiency with greater lumens.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An illumination system with multiple lamps, comprising:
    a beam splitter having four sides with a beam reflecting surface located on one of said four sides and a light output surface located on a second of said four sides thereof; and
    two light guiding means respectively disposed on a third and a fourth of said four sides of the beam splitter, and in optical communication therewith, each light guiding means comprising:
    a lamp; and
    a light tunnel having an end reflecting surface closed to one side of the lamp and the other end of the light tunnel being closed to the beam splitter, the end reflecting surface having an incident aperture;
    wherein light emitted from each lamp is converged to the end reflecting surface of the corresponding light tunnel and enters into the corresponding light tunnel through the incident aperture, and then the lights is outputted to the beam splitter located on the other side of the corresponding light tunnel and finally is outputted through the light output surface of the beam splitter.

2. The illumination system with multiple lamps of claim 1, wherein the lamp comprises a shade for converging the light generated from the lamp to the corresponding light tunnel.

3. The illumination system with multiple lamps of claim 2, wherein the shade is formed in an ellipsoidal surface such that the lamp is located at a first focus of the ellipsoidal surface and the incident aperture of the end reflecting surface of the light tunnel is located at a second focus thereof.

4. The illumination system with multiple lamps of claim 1, wherein incident angles of the light guided into the light tunnel are smaller than the full reflection critical angle in the light tunnel.

5. The illumination system with multiple lamps of claim 1, wherein the light tunnel is a solid light tunnel made of optic glass material.

6. The illumination system with multiple lamps of claim 1, wherein the light tunnel is a hollow structure using air as the transmission medium.

7. The illumination system with multiple lamps of claim 1, wherein the light tunnel is coated with a full reflection film.

8. The illumination system with multiple lamps of claim 1, wherein the light tunnel and the beam splitter are bonded by optical bonding.

9. The illumination system with multiple lamps of claim 1, wherein the light tunnel and the beam splitter are bonded by an air gap.

10. The illumination system with multiple lamps of claim 1, wherein the lamps in the light guiding means have same power or different power.

11. An illumination system with multiple lamps, comprising:
- a beam splitter having a light output surface located on one side thereof; and
  - three light guiding means respectively disposed on the rest three sides of the beam splitter, each light guiding means including:
  - a lamp; and
  - a light tunnel having an end reflecting surface closed to one side of the lamp and the other end of the light tunnel being closed to the beam splitter, the end reflecting surface having an incident aperture;
  - wherein light emitted from each lamp is converged to the end reflecting surface of one corresponding light tunnel and enter into the corresponding light tunnel through the incident aperture, and then the lights is outputted to the beam splitter located on the other side of the corresponding light tunnel and finally is outputted through the optical output surface of the beam splitter.

12. The illumination system with multiple lamps of claim 11, wherein the lamp includes a shade for converging the light generated from the lamp to the corresponding light tunnel.

13. The illumination system with multiple lamps of claim 12, wherein the lamp shade is formed in an ellipsoidal surface such that the lamp is located at a first focus of the ellipsoidal surface and the incident aperture of the end reflecting surface of the light tunnel is located at a second focus thereof.

14. The illumination system with multiple lamps of claim 11, wherein incident angles of the light guided into the light tunnel are smaller than the full reflection critical angle in the light tunnel.

15. The illumination system with multiple lamps of claim 11, wherein the light tunnel is a solid light tunnel made of optic glass material.

16. The illumination system with multiple lamps of claim 11, wherein the light tunnel is a hollow structure using air as the transmission medium.

17. The illumination system with multiple lamps of claim 11, wherein the light tunnel is coated with a full reflection film.

18. The illumination system with multiple lamps of claim 11, wherein the light tunnel and the beam splitter are bonded by optical bonding.

19. The illumination system with multiple lamps of claim 11, wherein the light tunnel and the beam splitter are bonded by an air gap.

20. The illumination system with multiple lamps of claim 11, wherein the lamps in the light guiding means have same power or different power.

* * * * *